United States Patent [19]

Mathur

[11] Patent Number: 4,789,243

[45] Date of Patent: Dec. 6, 1988

[54] ORIENTATION DETERMINING SYSTEM FOR A DEVICE

[75] Inventor: Prabodh Mathur, Tustin, Calif.

[73] Assignee: Amada Engineering & Service & Co., Inc., La Mirada, Calif.

[21] Appl. No.: 890,563

[22] Filed: Jul. 30, 1986

[51] Int. Cl.⁴ ............................................. G01B 11/14
[52] U.S. Cl. ...................................... 356/375; 356/1; 356/152
[58] Field of Search ....................... 250/227, 561, 578; 356/1, 372, 373, 375, 152; 219/124.34

[56] References Cited

U.S. PATENT DOCUMENTS

| | | | |
|---|---|---|---|
| 3,918,814 | 11/1975 | Weiser | 356/375 |
| 4,412,746 | 11/1983 | Yokouchi | 250/227 |
| 4,548,504 | 10/1985 | Morander | 356/375 |
| 4,567,347 | 1/1986 | Ito et al. | 356/1 |

Primary Examiner—F. L. Evans
Attorney, Agent, or Firm—Wigman & Cohen

[57] ABSTRACT

This invention discloses a system which automatically determines not only a distance from an object surface, but also an orientation of the device with respect to the object surface. This invention also discloses an arrangement of three or more position sensors for determining the orientation of the device, as well as the distance of the device from the object surface. Furthermore, this invention discloses a method of using parameter computation equations for determining the orientation and the distance of the device with respect to the object surface.

17 Claims, 5 Drawing Sheets

ORIENTATION DETERMINING SYSTEM FOR A DEVICE

BACKGROUND OF THE INVENTION

1. Field of the Invention

This invention relates to an orientation determining system, and more particularly relates to a system for determining the orientation of a device with respect to an object surface.

2. Description of the Prior Art

During laser material processing, it is often necessary to maintain not only the distance from the workpiece, but also the orientation of the cutting head with respect to the workpiece. A typical example of this situation is cutting with a laser beam, where usually it is best to have the focussed laser beam at a fixed distance and the axis of the laser beam normal to the workpiece surface during the cutting operation.

However, there are no systems currently available and known to this inventor that will automatically determine the orientation of the device with respect to the workpiece surface.

There, of course, does exist several systems which determine the perpendicular distance from the workpiece. One such system uses a laser diode for emitting a laser beam. The laser beam from it passes through projection lens. When the laser beam hits workpiece, it forms a spot. A focussing lens projects the image of this spot to position sensor (photo-detector). This sensor can be calibrated to give a reference voltage when itself is at a fixed distance (reference distance) from the workpiece. When the distance of the workpiece from the sensor changes the output thereof changes to a value related to the deviation from the reference distance.

SUMMARY OF INVENTION

One of the objects of this invention is to provide a system which automatically determines not only the distance from an object surface, but also the orientation of a device with respect to the object surface.

Another object of this invention is to provide an arrangement of three or more position sensors for determining the orientation of the device, as well as the distance of the device from the object surface.

Another object of this invention is to disclose a method of using parameter computation equations for determining the orientation and the distance of the device with respect to the object surface.

DESCRIPTION OF THE PREFERRED EMBODIMENTS OF THE INVENTION

Figure 1:
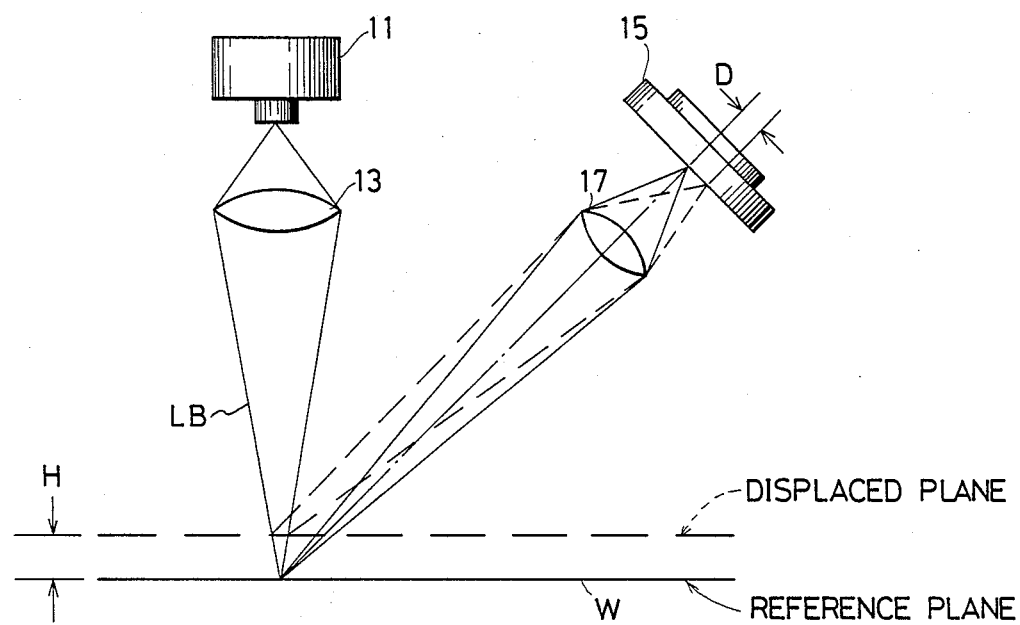
FIG. 1 is an explanatory diagram of an optically distance determining device.

Referring to FIG. 1, a typical distance determining device has a laser diode as laser source 11, and projection lens 13 for focussing the laser beam LB emitted from laser source 11 onto a surface of workpiece W as an object surface. The device also has position sensor 15 such as a photo-detector, and focussing lens 17 to position sensor 15. Laser beam LB emitted from laser source 11 is projected to the surface of workpiece W, and it forms a spot in the surface. Laser beam LB reflected from the surface of workpiece W is focussed on position sensor 15 through focussing lens 17.

Sensor 15 can be calibrated to give a reference voltage when it is at a fixed distance (reference distance) from the workpiece W. When the distance of workpiece W from the sensor changes, the sensor output changes to a value related to the deviation from the reference distance. Therefore, the relative distance between project lens 13 and the spot locally projected onto the workpiece surface is able to be determined with respect to the change of the output of sensor 15.

Figure 2:
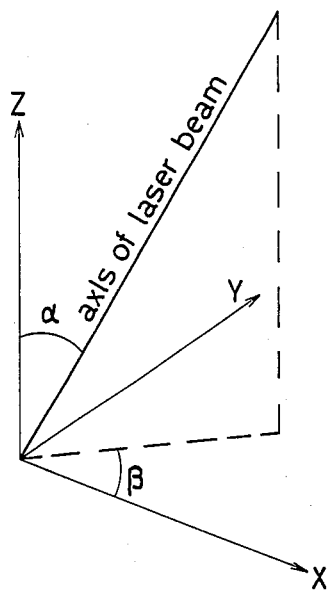
FIG. 2 is an explanatory diagram showing the orientation determination of an axis of laser beam.

It is then possible to define the orientation of the axis of the incident laser beam LB from laser source 11 with respect to the surface of workpiece W by means of detection of two specific angles the bearings $\beta$ and the azimuth $\alpha$ as shown in FIG. 2.

The two angles $\alpha$, $\beta$ referred above are to be defined through the detection of distances of at least three different spots in the workpiece surface.

Figure 3:
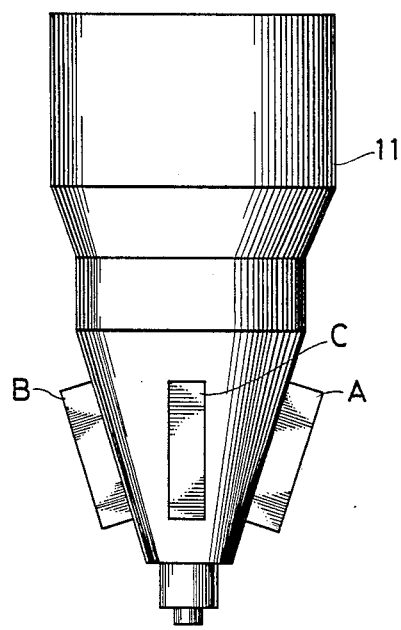
FIG. 3 is a front view of a laser head with distance sensing units installed around its body.

As shown in FIG. 3, three height sensing units A, B, C are arranged around laser source 11. The arrangement of height sensing units A, B, C can be done in several ways. Two arrangements are shown in FIG. 4 (called delta arrangement) and FIG. 5 (called quad arrangement).

Figure 4:
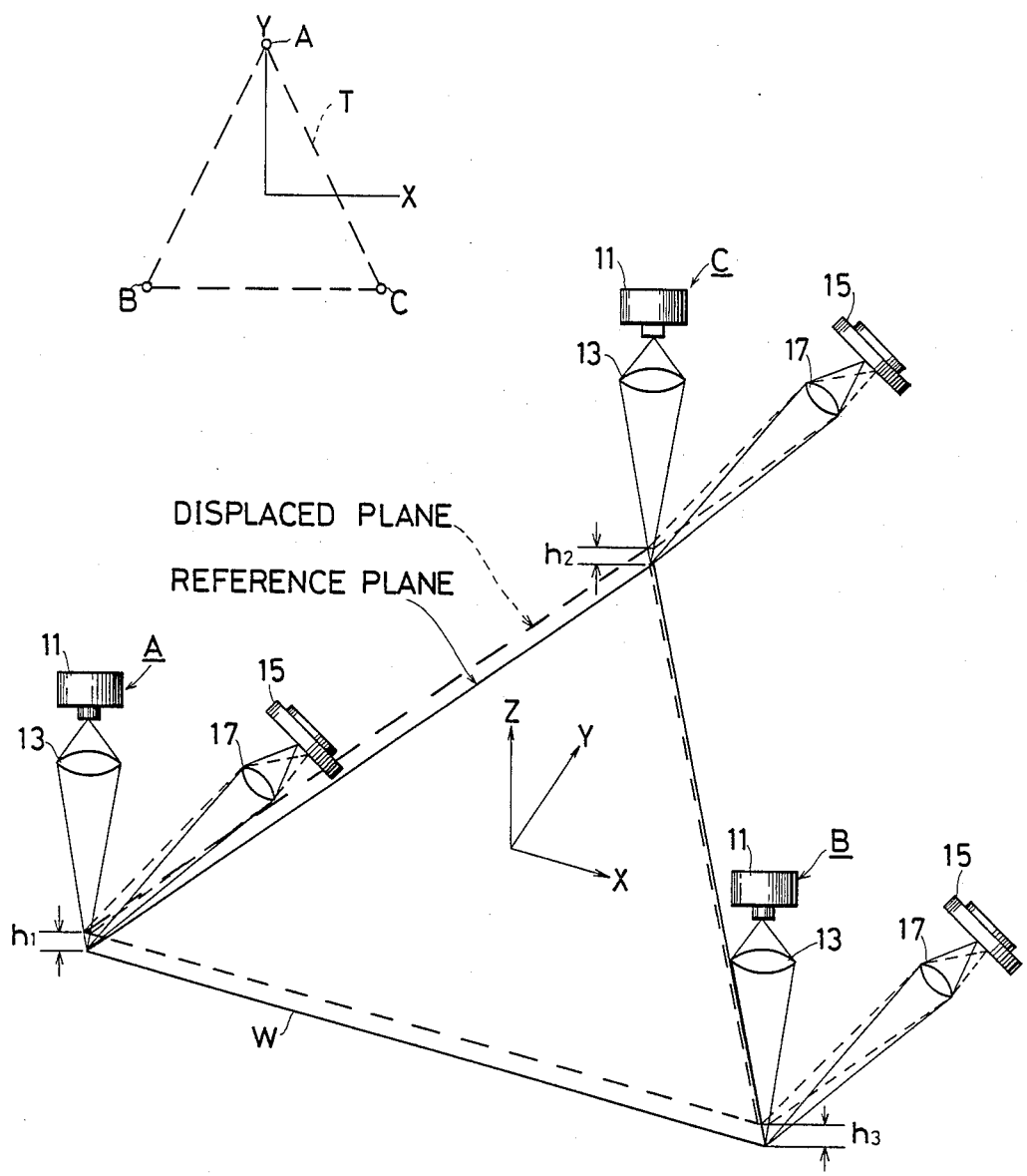
FIG. 4 is an explanatory diagram showing an embodiment of this invention.

As for the delta arrangement in FIG. 4, units A, B, C each comprises a laser source 11, projection lens 13, position sensor 15 and focussing lens 17, as set forth above in connection with FIG. 1. Each unit is so arranged as to be located at each apex of an equilateral triangle T imaginarily formed with putting the center thereof on the origin of three dimensional coordinate x, y, z. Each unit is operable in the same manner as set forth above in connection with FIG. 1. Thus, each unit detects the distance from the incident spot of the laser beam LB on the surface of workpiece W. It should be noted that the same laser diodes 11 and the same projection lens 13 are mounted in the same manner at each of the units A, B, C, so that the same laser beams are impinged upon the workpiece, and the laser beams reflected from the workpiece are detected by the position sensors 15 in the same manner. So, sensory information availed by each unit A, B or C is h1, h2 or h3 which is the distance (height) of the surface from the sensing unit.

Figure 6:
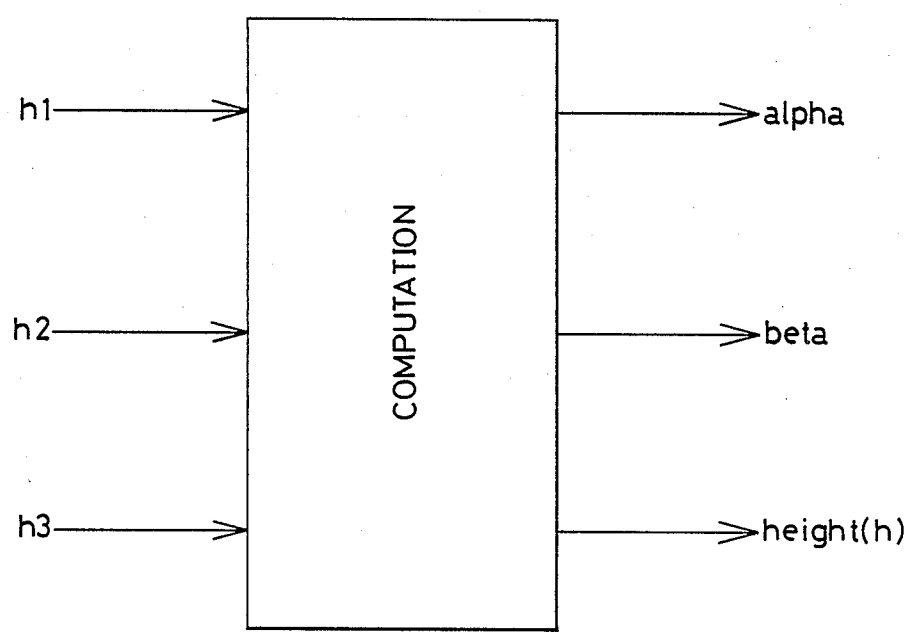
FIG. 6 is an explanatory block diagram of a parameter computation system of this invention.

Then, the angles alpha ($\alpha$) and beta ($\beta$) which define the orientation are determined from this information having the computation equations as shown in FIG. 6.

In general the form of the equations are:
height (h)=function of (h1, h2, h3 and geometry)
alpha ($\alpha$)=function of (h1, h2, h3 and geometry)
beta ($\beta$)=function of (h1, h2, h3 and geometry)

The exact computation equation depends upon the arrangement used. For the delta arrangement, sample equations are given below.

The approximate equations for the delta arrangement are, (for small alpha only)

$$h = (h1 + h2 + h3) \div 3$$

$$\cos \alpha = 3 \div \sqrt{9 + (x1 - x2)^2 + (x1 + x2)^2}$$

$$\tan \beta \neq (x1 + x2) \div \sqrt{3(x2 - x1)}$$

where:

h: height of sensing system from workpiece
h1: height of sensing unit A from workpiece
h2: height of sensing unit C from workpiece
h3: height of sensing unit B from workpiece
d: length of side of equilateral triangle formed by individual height sensing units
x1: $(h2-h1) \div d$
x2: $(h3-h1) \div d$ For example, when workpiece W is deplaced to the position shown by dotted line from the reference position shown by the solid line, the distance (height) is calculated using the equation of h, which is the average of the three height parameters h1, h2 and h3. And the angles ($\alpha$) and ($\beta$) are determined using the equations of $\cos(\alpha)$, $\tan(\beta)$.

Figure 5:
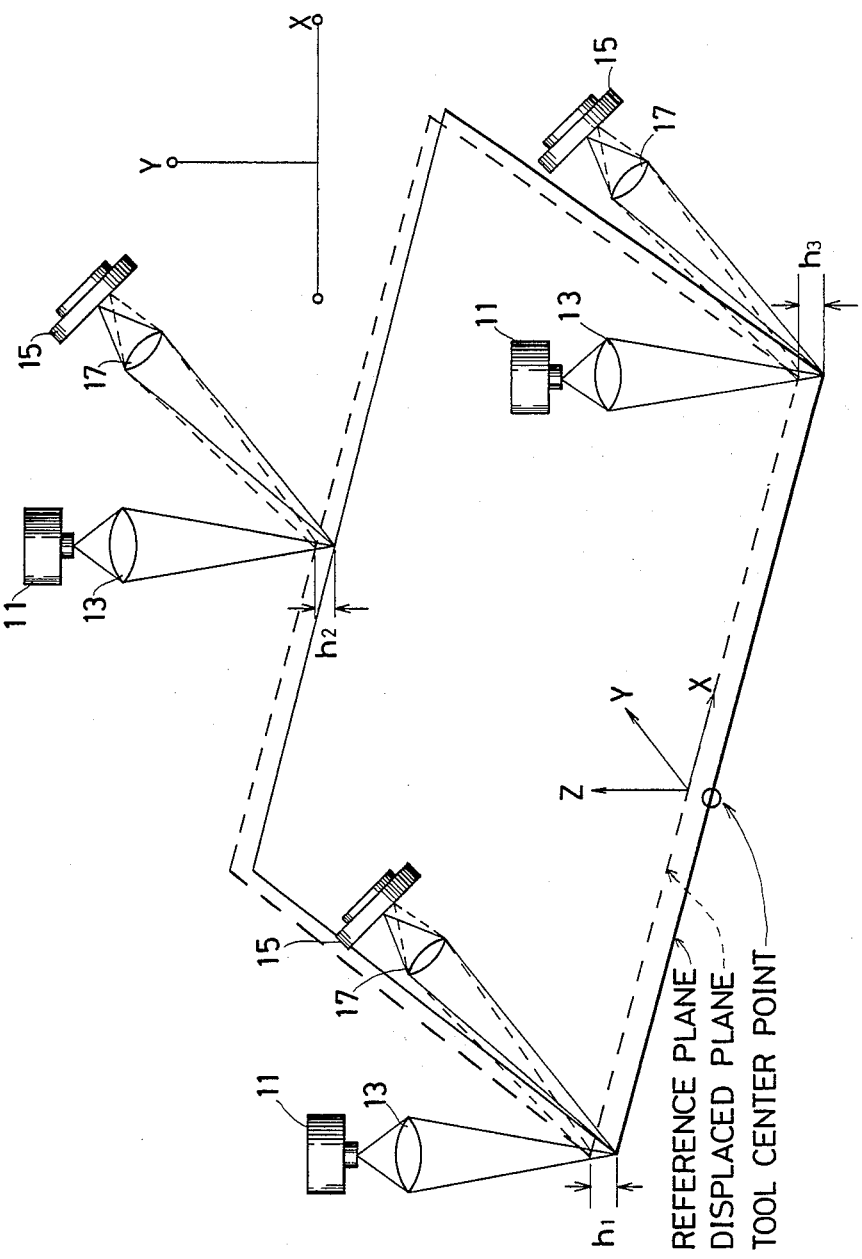
FIG. 5 is an explanatory diagram showing another embodiment of this invention.

In another arrangement of the sensing units the quad arrangement is also practicable. In this quad arrangement as shown in FIG. 5, one of the sensing units A is located on the y axis and other two units B and C are located in the symmetrical positions on x axis, and the distance of each unit from the origin of the xyz coordinate on the reference surface of workpiece W is equivalent. As for this embodiment, each unit comprises a laser source 11, projection lens 13, position sensor 15 and focussing lens 17. Moreover, each unit can be attached to the common laser head as laser source 11 and projection lens 13 as shown in FIG. 3.

This system also works with other types of height and orientation sensing units. The application of this invention is not limited to laser material processing, but is broadly applicable to orientation determination of various devices. The arrangement of the three sensing units on the laser material processing head is arbitrary. The computation equations have to take care of the actual arrangement. More than three sensing units may be used to increase redundancy, reliability and accuracy.

While the invention has been described with reference to the specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In a laser material-processing device including laser generating means and projection lens means for focussing a laser beam from said laser generating means onto a region of an object surface, an orientation determining system for said device comprising:
at least three sensing means arranged around an axis of said device for detecting the distances of the sensing means from said object surface, and
means for calculating an actual distance of said laser generating means from said surface, and the angular orientation of said laser generating means relative to said surface, from the detected distances using specific computation equations.

2. An orientation determining system of a device as defined by claim 1, wherein each said means for detecting the distances comprises a laser source, a projection lens to focus the laser beam emitted from said laser source to said surface, and a position sensor and focussing lens to focus the reflected laser beam from said surface to said position sensor.

3. An orientation determining system of a device as defined by claim 1, wherein said orientation is determined as a function of an azimuth angle $\alpha$ and a bearing angle $\beta$ of said axis through adaptation of said detected distances to said specific computation equations.

4. An orientation determining system of a device as defined by claim 1, wherein said means for determining the distances are respectively arranged at each apex of an equilateral triangle imaginarily formed around said axis of said device.

5. An orientation determining system of a device as defined by claim 1, wherein one of said sensing means is arranged so as to be positioned on a y axis and two other sensing means are arranged so as to be symmetrically positioned on an x axis, whereby xyz coordinates are defined on said surface.

6. An orientation determining system of a device as defined by claim 2, wherein said orientation is determined as a function of an azimuth angle $\alpha$ and a bearing angle $\beta$ of said axis through adaptation of said detected distances to said specific computation equations.

7. An orientation determining system of a device as defined by claim 2, wherein said means for determining the distances are each respectively arranged at one apex of an equilateral triangle imaginarily formed around said axis of said device.

8. An orientation determining system of a device as defined by claim 3, wherein said means for determining the distances are each respectively arranged at one apex of an equilateral triangle imaginarily formed around said axis of said device.

9. An orientation determining system of a device as defined by claim 2, wherein one of said sensing means is arranged so as to be positioned on a y axis and two other sensing means are arranged so as to be symmetrically positioned on an x axis, where xyz coordinates are defined on said surface.

10. An orientation determining system of a device as defined by claim 3, wherein one of said sensing means is arranged so as to be positioned on a y axis and two other sensing means are arranged so as to be symmetrically positioned on an x axis, where xyz coordinates are defined on said surface.

11. An orientation determining system as defined by claim 1, wherein each of said sensing means is installed on said device, and said at least three sensing means are arranged peripherally about said projection lens means.

12. An orientation determining system of a device, comprising:
means comprising three or more sensing units arranged around an axis of said device for detecting the distances of the means from an object surface,
said means for determining the distances being respectively arranged at each apex of an equilateral triangle imaginarily formed around said axis of said device,
each of said means for detecting the distances including a laser source, a projection lens to focus a laser beam emitted from said laser source to said surface, and a position sensor and focussing lens to focus a relected laser beam from said surface to said position sensor, and
means for calculating an actual distance of said device from said surface, and a first azimuth angle $\alpha$ and a second bearing angle $\beta$ of said axis relative to said object surface, from the detected distances by using the following equations:

$$h = (h1 + h2 + h3)/3$$

$$\cos \alpha = 3/\sqrt{9 + (x1 - x2)^2 + (x1 + x2)^2}$$

$$\tan \beta = (x1 + x2)/\sqrt{3(x2 - x1)}$$

where
- h = the height of said device from said object surface,
- h1 = the height of one of said sensing units from said object surface,
- h2 = the height of a second one of said sensing units from said surface,
- h3 = the height of the a third one of said sensing units from said surface,
- d = the length of a side of said equilateral triangle
- x1 = (h2 − h1)/d
- x2 = (h3 − h1)/d.

13. An orientation determining system of a device as defined by claim 12, wherein said system is adapted to a laser material processing head.

14. A system for determining the orientation of a laser material processing head relative to an object surface, the head including a laser source having a nozzle for outputting a laser beam and a projection lens for focussing the laser beam at a region on the object surface, said system comprising:

at least three detecting means, carried by said laser material processing head and arranged peripherally about said projection lens, for detecting the distances of each of said detecting means from said object surface region, and means for determining the angular orientation of said laser material processing head relative to said object surface region by using specific computation equations to correlate the distances detected by said detecting means.

15. A laser material processing head, comprising:
(a) head means including a nozzle for outputting a laser beam;
(b) three or more detecting means for detecting distances of the means from an object surface, the detecting means being installed on the head means so as to surround the nozzle thereof; and
(c) means for calculating the angular orientation of said head means relative to said object surface by using distances detected by said detecting means.

16. A method of determining an orientation of a device relative to an object surface comprising steps of:
(a) installing around the device three or more means for detecting distances of the means from the object surface; and
(b) calculating an orientation of the device relative to the object surface by using distances detected by the detecting means.

17. A method according to claim 16, wherein each of the detecting means has light source means for impinging a light beam onto the object surface and position sensor means for receiving a light beam reflected from the object surface so as to detect the distance of the detecting means from the object surface.

* * * * *